Patented Mar. 25, 1924.

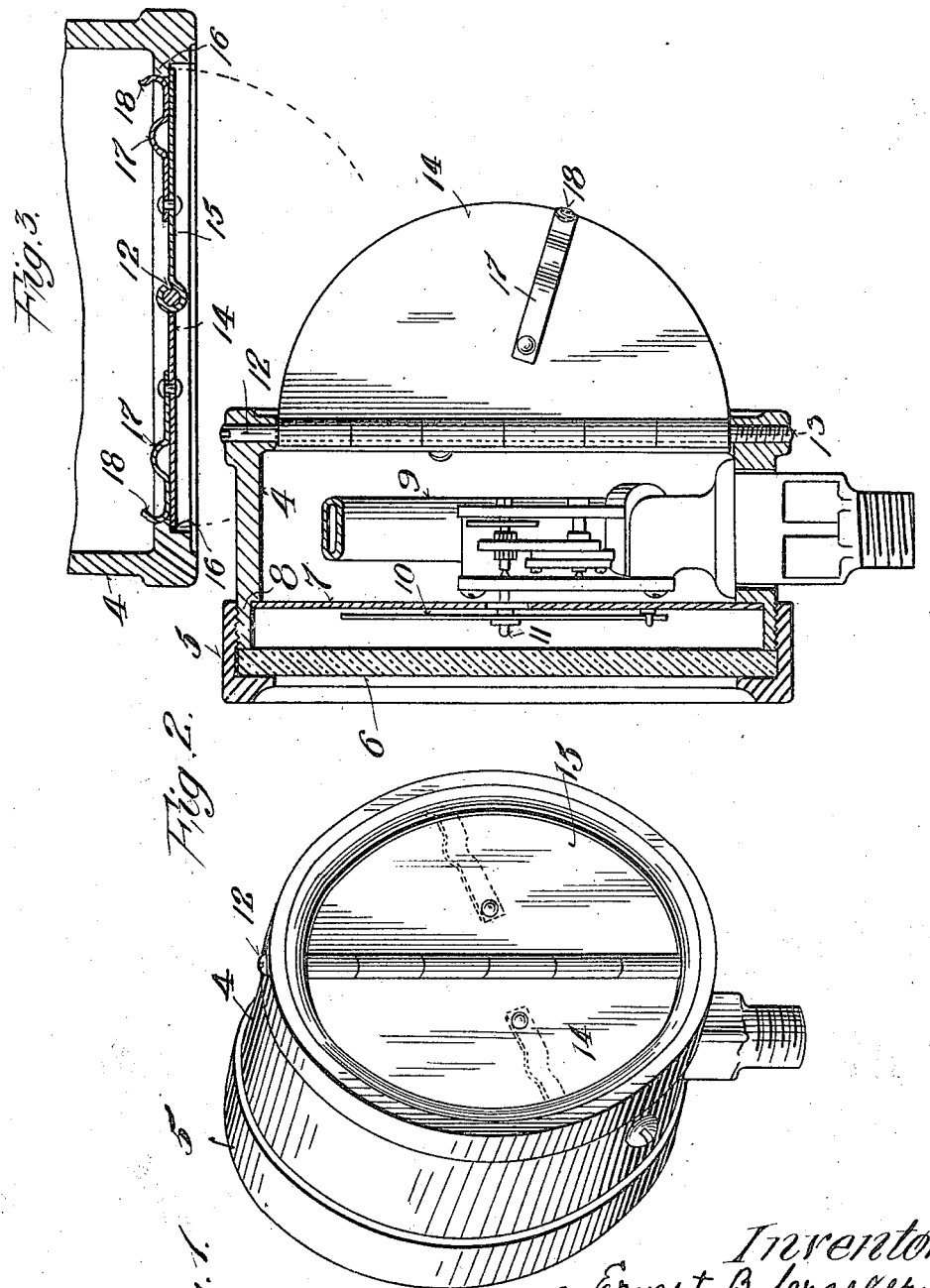

1,488,034

UNITED STATES PATENT OFFICE.

ERNEST B. CROCKER, OF STRATFORD, AND OTTO W. HEISE, OF BRIDGEPORT, CONNECTICUT, ASSIGNORS TO MANNING, MAXWELL & MOORE, INCORPORATED, OF NEW YORK, N. Y., A CORPORATION OF NEW JERSEY.

PRESSURE GAUGE.

Application filed June 13, 1919. Serial No. 304,074.

*To all whom it may concern:*

Be it known that we, ERNEST B. CROCKER and OTTO W. HEISE, both citizens of the United States, and residents, respectively, of Stratford and Bridgeport, in the county of Fairfield, State of Connecticut, have made a certain new and useful Invention in Pressure Gauges, of which the following is a specification.

This invention relates to casings liable to be subjected to sudden high internal pressures, and in its more specific applications to pressure gauges.

The object of the invention is to provide a pressure gauge which is simple in structure and efficient in operation, and wherein means are provided to prevent injury due to explosions occurring through rupture of the pressure responsive element of the gauge.

A further object of the invention is to provide a gauge case of such construction that when an explosion or sudden generation or release of pressure within the casing takes place, the danger of rupturing, breaking or blowing out of the dial plate and glass cover is avoided.

A further object is to provide the case with releasable doors or door sections, which fly open and hence permit relief of any undue pressure accumulating within the case, but which doors or door sections remain attached to the casing when pressed open.

Other objects of the invention will occur more fully hereinafter.

Any enclosure liable to be subjected to sudden high internal pressure must be provided with adequate pressure relief means in order that the structure itself may not be ruptured or portions thereof destroyed. This is true of pressure gauges, and particularly where such gauges are used with tanks containing gases under high pressure, as for example tanks containing compressed oxygen. In apparatus intended to be used with compressed gases if there should occur an explosion due to any cause, it might cause not only injury to the apparatus, but danger to those who may be in the vicinity.

For example, if the pressure tube of a Bourdon gauge containing gas under high pressure should burst, a sudden pressure may be created within the casing of the gauge which may disrupt the casing.

The object of this invention, as applied to this specific embodiment therefore, is to provide means whereby such internal pressures may be rapidly released so that the force of the explosion is dissipated and the parts of the apparatus are confined in such a manner that they do not form a source of danger in the vicinity.

The invention accordingly consists in the features of construction, combinations of elements and arrangement of parts which will be exemplified in the construction hereinafter set forth, and the scope of the application of which will be indicated in the following claims.

In the accompanying drawings is shown one of the various possible embodiments of this invention.

In the accompanying drawing—

Fig. 1 is a view in perspective of a gauge case showing the hinged doors or door sections constituting the rear end wall of the case.

Fig. 2 is a sectional view taken in the plane of the geometric axis of the gauge case, the hinged door or door section being shown open.

Fig. 3 is a broken detail view in central section of the rear open end of the case, showing the hinged doors or door sections closed and the spring catches for releasably retaining them in closed position.

The same part is designated by the same reference numeral wherever it occurs throughout the several views.

In relieving the instantaneous heavy pressures, one of the problems is to provide mechanism sufficiently responsive, because in view of the enormous pressures involved, and the rapidity with which they are generated, the inertia of the parts and the time required for them to operate is of great moment. For the solution of this problem it is important, therefore, that the apparatus be so designed as to relieve the pressure as nearly instantaneously as possible, and to this end, it is desirable that the moving parts shall have the minimum of inertia, shall move with the minimum velocity and shall create the maximum area of relief opening in the minimum time.

Furthermore, in view of the fact that the moving parts move at high velocity and with large momentum, it is desirable that they shall move in a constrained path in order that no harmful results shall ensue.

The invention is particularly illustrated in connection with a gauge of the Bourdon type.

As a convenient form of relief opening, a door may be provided upon the casing adapted to open in response to excessive internal pressures to relieve such pressures. It is desirable to divide this door into a plurality of portions. In this manner the inertia of the moving parts is very greatly reduced and the area of the opening provided during the initial stages of the opening movement is greatly increased. Thus the parts swing open in shorter time and the area being opened up is doubled.

It is an advantage furthermore that the portions be so mounted that the momentum of one of them will be opposed and absorbed by that of another. In the form of my invention illustrated these portions are hinged along a radial line whereby there is obtained a great length and strength of hinge, which successfully resists of tendency of an explosion to rip the door from its hinges. The hinging of two different portions along their adjacent edges forms a convenient means of causing the one part to absorb the momentum of the other, by causing the two parts to come together on their opening movement.

In the embodiment of the invention illustrated there is provided a closure diametrically divided into two parts and hinged along the diameter, but it will, of course, be understood that where the word "radial" is used, it may include such diametrical division as an embodiment thereof.

By this particular construction, it will be seen that the doors are so arranged that the rotative effect of one of them is destroyed by that of the other, as the two doors meet each other. In this way the inertia of the part is absorbed without having its full strain come upon the casing through the medium of the hinge.

Referring to the drawing, reference numeral 4 designates the open ended tubular shell or casing, one end of which is exteriorly threaded to receive a cap ring 5, which retains in place the usual face plate 6 which is of glass or other suitable transparent material. The ordinary thin metal dial plate 7 is suitably supported within the shell or case adjacent to the transparent face plate 6. In the particular form shown, to which, however, our invention is not to be limited or restricted, the dial plate 7 is supported on an annular shoulder 8 formed in the shell or case 4. Suitably disposed within the shell is the pressure responsive element of the gauge, indicated generally by reference numeral 9. This sensitive element may be of any ordinary or suitable construction familiar in the art, and in the details thereof forms no part of our present invention. The pointer or hand 10 which cooperates with scale graduations on the dial plate 7 is operated in the usual manner by the pressure responsive element 9 through suitable connections including shaft 11, which extends through the center of the dial plate 7.

Extending diametrically across the other open end of the shell or case 4 is a strong substantial hinge pin 12, which is secured at its ends in the shell or case. A simple and effective arrangement is shown wherein one end of the hinge pin is threaded, as at 13, and tapped into a threaded opening through the shell 4, the other end of the pin is received through a hole diametrically opposite but in line with the treaded opening which receives the threaded end of the pin. Suitably hinged to the hinge rod 12 are the doors or door sections 14, 15, which are segmental in shape and together operate to close the end of the tubular shell, the peripheral edges thereof resting against an annular shoulder 16 on the shell. The doors or sections 14, 15, are releasably retained in closed position. This can be accomplished in many different ways. A simple and effective arrangement is shown wherein spring clips 17 are secured to the inner faces of the door sections and the free ends thereof extend slightly beyond the peripheral edges of the door sections and are curved inwardly, as indicated at 18, to snap over the edge of shoulder 16 when the door sections are closed to retain the door sections in their closed position. In case of an undue accumulation of pressure inside of the shell, or in case of an explosion occurring within the shell, the spring retainers are overcome, and the door sections fly open, thereby instantly relieving the resulting pressure in the interior of the case by the widest possible opening, and hence preventing such pressure from causing the dial plate or the glass face plate to be blown out. It will be observed that the segmental door sections move through an arc of ninety degrees in attaining their complete opened position, but this movement is accomplished quickly upon a comparatively short radius, and without any substantial retardation due to inertia such as would result if the entire cover plate moved as one integral piece. It will also be seen that the door sections are permanently retained by the substantial hinge pin, which, in itself offers inappreciable obstruction to the escape of pressure from the interior of the case, and hence we avoid the danger of the door sections being blown off by an explosion within the shell with the possibility of striking or injuring an attendant or other person in the vicinity.

It will be understood that may variations and changes in the details of structure and arrangement will readily occur to persons skilled in the art without departure from the spirit or scope of our invention. We do not desire, therefore, to be limited or restricted to the exact details shown and described.

But, having now set forth the objects and nature of our invention, and a structure embodying the principles thereof, what we claim as new and useful and of our joint invention, and desire to secure by Letters Patent, is:

1. In a device of the character described, in combination, a cylindrical casing open at one end and liable to be subjected to sudden and heavy internal pressures, and closure means for the open end of said casing comprising a plurality of members hinged to swing about an axis radial to the wall of the casing and adapted to close said casing under normal conditions and to be released by swinging toward one another about said axis under conditions of abnormal pressure.

2. In a device of the character described, in combination, a cylindrical casing, a pressure responsive element within the casing, mechanism in one end of the casing operated by the pressure responsive element, and closure means for the other end of the casing comprising a plurality of members hinged to swing about an axis radial to the wall of the casing and adapted to close said casing under normal conditions and to be released by swinging toward one another about said axis under conditions of abnormal pressure.

3. In a pressure gauge, a casing open at both ends, a dial plate forming a closure for one end of the casing, a hinge rod permanently secured to and extending diametrically across the other end of the casing, door sections hinged to said rod, spring clips to releasably retain said door sections closed, and a pressure responsive element arranged within the casing and disposed between the dial plate and said hinged doors.

4. In a pressure gauge, a casing open at both ends and having an annular shoulder at one of its open ends; a dial plate forming a closure for one end of the casing, a hinge rod secured to and extending transversely across the other end of the casing adjacent to said shoulder, door sections hinged to said rod, spring clips carried by said door sections to snap over said annular shoulder, and a pressure responsive element arranged within the casing and disposed between the dial plate and said hinged door sections.

5. In a pressure gauge, a tubular casing open at both ends, one end of said casing being threaded and the other end formed with an annular shoulder, a dial plate arranged in the casing adjacent to the threaded end thereof, a transparent face plate arranged adjacent to the dial, a screw ring applied to the threaded end of the casing to retain the face plate in position, a hinge rod extending diametrically across the shouldered end of the casing and permanently secured thereto, door segments hinged to said rod and having spring clips to engage said shoulder, and a pressure responsive element arranged within the casing and disposed between the dial plate and hinged door segments.

6. A device of the class described having a substantially cylindrical casing in which heavy internal pressures may at times be generated, said casing being open at one end, and closure means for the open end of the casing comprising a plurality of doors each hinged to swing about an axis substantially radial to the cylindrical wall of the casing, said doors normally being closed but opening under abnormal pressure conditions in the casing.

7. A pressure gauge having a cylindrical casing for enclosing the gauge mechanism, and a closure for one end of the casing comprising a plurality of normally closed hinged doors so disposed relatively to each other that when opened outwardly by pressure within the casing they swing into contact whereby each limits the movement of the other.

In testimony whereof we have hereunto set our hands on this 6th day of June A. D., 1919.

ERNEST B. CROCKER.
OTTO W. HEISE.